United States Patent
Ebadian et al.

(10) Patent No.: US 10,657,345 B1
(45) Date of Patent: May 19, 2020

(54) MEDIA DESTRUCTION VERIFICATION APPARATUS

(71) Applicant: Phiston Technologies, Inc., Miami, FL (US)

(72) Inventors: M. Ali Ebadian, Miami, FL (US); Raul Travieso, Miami, FL (US)

(73) Assignee: Phiston Technologies, Inc., Miami, FL (US)

( * ) Notice: Subject to any disclaimer, the term of this patent is extended or adjusted under 35 U.S.C. 154(b) by 0 days.

(21) Appl. No.: 16/460,024

(22) Filed: Jul. 2, 2019

(51) Int. Cl.
  *G06K 7/10* (2006.01)
  *G06K 7/14* (2006.01)
  *G11B 5/024* (2006.01)

(52) U.S. Cl.
  CPC ......... *G06K 7/1456* (2013.01); *G06K 7/1443* (2013.01); *G06K 7/1447* (2013.01); *G11B 5/0245* (2013.01)

(58) Field of Classification Search
  CPC ... G06K 7/10722; G06K 7/14; G06K 7/10851
  USPC ......................................................... 235/454
  See application file for complete search history.

(56) References Cited

U.S. PATENT DOCUMENTS

| | | |
|---|---|---|
| 4,507 A | 5/1846 | Clark |
| 2,222,073 A | 11/1940 | Hauge |
| 2,292,901 A | 8/1942 | Schmitz, Jr. |
| 2,535,714 A | 12/1950 | Anderson et al. |
| 2,646,726 A | 7/1953 | Fogg |
| 2,682,098 A | 6/1954 | Wilcox |
| 2,838,720 A | 6/1958 | Dostal |
| 2,962,560 A | 11/1960 | Folse |
| 2,974,695 A | 3/1961 | Pfeffer |
| 3,169,435 A | 2/1965 | Hartger |
| 3,321,586 A | 5/1967 | Krones |
| 3,461,497 A | 8/1969 | Geyer |
| 3,995,768 A | 12/1976 | Montalbano et al. |
| 4,157,581 A | 6/1979 | Keiichi et al. |
| 4,161,296 A | 7/1979 | Parker et al. |
| 4,272,032 A | 6/1981 | Hellberg |

(Continued)

OTHER PUBLICATIONS

Anonymous, "Experience the peace of mind of high security data storage media destruction", Marketing pamphlet, Phiston Technologies, Inc., Company marketing file: Phitech10.042.613, Miami, Florida, (2015).

(Continued)

*Primary Examiner* — Ahshik Kim
(74) *Attorney, Agent, or Firm* — McHale & Slavin, P.A.

(57) ABSTRACT

A verification apparatus securable to a media destruction device to document sanitization processes. The apparatus includes a SSD disk inlet, an SSD disk outlet constructed and arranged to align with an opening to the media destruction device, and a SSD disk ejection outlet. A carrier drum having a receptacle for holding the SSD disk in a first position, rotatable to a second position for placement of the SSD disk in front of a scanner camera, rotatable to a third position for aligning the SSD disk to a media destruction device inlet if the media disk was properly scanned, and rotatable to a fourth position for aligning the SSD disk to the ejection outlet if the media disk was not properly scanned. Pseudo random codes are transmitted and received during a sanitization procedure to assure the SSD disk has sanitized without interruption.

7 Claims, 10 Drawing Sheets

(56) References Cited

U.S. PATENT DOCUMENTS

| | | | |
|---|---|---|---|
| 4,286,295 | A | 8/1981 | Ipolyi |
| 4,291,618 | A | 9/1981 | Heiser et al. |
| 4,423,460 | A | 12/1983 | Jackson et al. |
| 4,423,844 | A | 1/1984 | Sours et al. |
| 4,529,134 | A | 7/1985 | Williams |
| 4,551,782 | A | 11/1985 | Seely et al. |
| 4,609,155 | A | 9/1986 | Garnier |
| 4,621,299 | A | 11/1986 | Hill |
| 4,625,925 | A | 12/1986 | Goldhammer |
| 4,639,821 | A | 1/1987 | Littwin et al. |
| 4,669,673 | A | 6/1987 | Lodovico et al. |
| 4,690,340 | A | 9/1987 | Hatanaka |
| 4,757,419 | A | 7/1988 | Masaki |
| 4,923,126 | A | 5/1990 | Lodovico et al. |
| 5,090,628 | A | 2/1992 | Porter |
| 5,110,060 | A | 5/1992 | Lundquist |
| 5,132,860 | A | 7/1992 | Von Stein |
| 5,198,959 | A | 3/1993 | Scholtysik et al. |
| 5,203,513 | A | 4/1993 | Keller et al. |
| 5,292,078 | A | 3/1994 | Lodovico et al. |
| 5,302,078 | A | 4/1994 | Essick et al. |
| 5,580,009 | A | 12/1996 | Kennedy |
| 5,611,495 | A | 3/1997 | Williams |
| 5,666,413 | A | 9/1997 | Kempf |
| 5,691,873 | A | 11/1997 | Masaki |
| 5,711,492 | A | 1/1998 | Cheladze |
| 5,721,665 | A | 2/1998 | Schultz |
| 5,765,765 | A | 6/1998 | Tamura et al. |
| 5,884,855 | A | 3/1999 | Chang |
| 5,904,305 | A | 5/1999 | Kaczmarek |
| 5,979,774 | A | 11/1999 | Urushibata |
| 6,202,949 | B1 | 3/2001 | Hayles, Jr. |
| 6,439,486 | B1 | 8/2002 | Nitta et al. |
| 6,523,767 | B1 | 2/2003 | Ramesohl |
| 6,527,209 | B1 | 3/2003 | Dorscht |
| 6,565,026 | B1 | 5/2003 | Hall |
| 6,714,398 | B2 | 3/2004 | Schultz |
| 7,267,146 | B2 | 9/2007 | Olofsson |
| 7,267,294 | B2 | 9/2007 | Castronovo |
| 7,270,282 | B2 | 9/2007 | Castronovo |
| 7,324,321 | B2 | 1/2008 | Olliges |
| 7,334,747 | B2 | 2/2008 | Castronovo |
| 7,357,340 | B2 | 4/2008 | Castronovo |
| 7,424,981 | B2 | 9/2008 | Castronovo |
| 7,448,562 | B2 | 11/2008 | Castronovo |
| 7,500,625 | B2 | 3/2009 | Castronovo |
| 7,652,837 | B2 | 1/2010 | Kitamura et al. |
| 7,852,590 | B1 | 12/2010 | Olliges |
| 7,861,956 | B2 | 1/2011 | Hiller, Sr. |
| 7,975,950 | B2 | 7/2011 | Ebadian et al. |
| 8,064,183 | B2 | 11/2011 | Olliges |
| 8,158,043 | B2 | 4/2012 | Gibson et al. |
| 8,356,764 | B2 | 1/2013 | Aizenberg et al. |
| 8,794,559 | B1 * | 8/2014 | Olliges ............... B30B 1/32 241/243 |
| 9,440,313 | B2 * | 9/2016 | Clark .................. B23C 1/08 |
| 9,776,192 | B2 | 10/2017 | Ebadian et al. |
| 10,071,382 | B1 * | 9/2018 | Ebadian ............ B02C 18/2216 |
| 10,242,699 | B1 | 3/2019 | Ebadian et al. |
| 2001/0045478 | A1 | 11/2001 | Recker et al. |
| 2003/0015818 | A1 | 1/2003 | Magvire |
| 2003/0089806 | A1 | 5/2003 | Galanty |
| 2004/0112999 | A1 | 6/2004 | Byram et al. |
| 2005/0040263 | A1 | 2/2005 | Parke |
| 2005/0041319 | A1 | 2/2005 | Hasegawa et al. |
| 2006/0016919 | A1 | 1/2006 | Castronovo |
| 2006/0018075 | A1 | 1/2006 | Schultz |
| 2007/0075168 | A1 | 4/2007 | Rodriguez et al. |
| 2007/0125895 | A1 | 6/2007 | Chen |
| 2007/0247776 | A1 * | 10/2007 | Tamura ............... G11B 5/0245 361/149 |
| 2008/0257993 | A1 | 10/2008 | Cole et al. |
| 2009/0140086 | A1 * | 6/2009 | Thiel .................. B02C 18/142 241/27 |
| 2010/0201024 | A1 | 8/2010 | Gibson et al. |
| 2010/0276524 | A1 | 11/2010 | Ebadian et al. |
| 2010/0294865 | A1 | 11/2010 | Wozny |
| 2012/0276331 | A1 | 11/2012 | Orr et al. |
| 2012/0282436 | A1 | 11/2012 | Coe et al. |
| 2013/0014965 | A1 | 1/2013 | Barger |
| 2013/0320121 | A1 | 12/2013 | Ko |
| 2014/0209718 | A1 | 7/2014 | Bevins |
| 2014/0209723 | A1 | 7/2014 | Ebadian et al. |
| 2014/0299702 | A1 | 10/2014 | Kroell et al. |
| 2015/0041576 | A1 | 2/2015 | Romanovich |
| 2015/0328642 | A1 | 11/2015 | Shegerian et al. |
| 2016/0046040 | A1 | 2/2016 | Dahlheimer et al. |
| 2017/0246640 | A1 | 8/2017 | Wagner et al. |

OTHER PUBLICATIONS

Anonymous, "Phiston MediaDice: A patented high security optical media destroyer that disintegrates CDs, DVDs, Blu-Ray discs, and magnetic strip cards", Marketing Pamphlet, Phiston Technologies, Inc., Miami, Florida, (2015).

Definition of tang, the Free Dictionary, Farlex.

* cited by examiner

MEDIA DESTRUCTION VERIFICATION APPARATUS

FIELD OF THE INVENTION

This invention is related to the field of sensitive material destruction and, in particular, to an apparatus to provide a tamperproof documentation link for sanitizing of media disks.

BACKGROUND OF THE INVENTION

As technology evolves, sensitive media in the form of digital data is stored on disks that can be copied, exposing the media to misuse. Electronically stored media can contain extremely confidential information. For this reason, it is critical that sensitive information stored on a disk is disposed of in a manner where the information is absolutely unrecoverable. Various mechanisms exist wherein the digital data stored on a disk or like media is electronically or physically destroyed. The goal being to assure that any sensitive material on the disk has been rendered unusable, and proof of the destroyed disk exists.

Data destroying devices are described in Applicant's prior patents, including U.S. Pat. No. 7,324,321 for a Degaussing Apparatus; U.S. Pat. No. 7,852,590 for a Solid State Memory Decommissioner; and U.S. Pat. No. 8,064,183 for a Capacitor Based Bi-Directional Degaussing Apparatus.

Applicant's U.S. Pat. No. 8,794,559 discloses an apparatus for destroying memory devices, like hard drives, by compression and electrical current to destroy the memory media inside the memory device. The apparatus includes a pair of opposed compression plates; at least one plate is grounded, while the other plate, charged with 5 to 100 volts of electricity, is movable toward the other by a linear motion force.

Applicant's U.S. Pat. No. 9,776,192 discloses a device for comminuting media materials. The device is a rotating mill core with removable flat edged blades, a set of stacked bed knives and a screen. The mill core rotates in close proximity to adjustable bed knives to shear the material being fed before passing through a screen in order to grate the material.

Applicant's U.S. Pat. No. 10,071,382 discloses a device to reduce solid state drives into particles less than 2 mm maximum edge length. A blade assembly is designed to provide multiple cutting angles while rotating at 520 rpm to maintain a low decibel rating.

Applicant's U.S. Pat. No. 10,242,699 discloses a single magnetic pulse degaussing apparatus for use in erasing information contained on magnetic recording or storage media. A degaussing chamber for receipt of magnetic forces above 2.0 Tesla is accessible by upper and lower rotary actuated doors. The internal flux of a coil is measured by the current passing through the coil during the discharge cycle to provide flux versus time measurements. The measurements are inserted into a performance verification algorithm to assure sufficient time for media destruction has taken place before releasing the media from the degaussing chamber.

In some instances, media can be placed on a planar flat material that can literally be ground to dust. A common need for all devices that render media unusable, whether or not the disks are physically destroyed, is to provide an apparatus that provides a tamperproof method of documenting the sanitization of an SSD disk.

SUMMARY OF THE INVENTION

Disclosed is a verification apparatus for documenting the sanitization process of an SSD media disk. The apparatus comprises a housing that attaches to a sanitization device to provide an automated and tamperproof link from the scanning of identification data on the media disk to the destruction of the media disk to assure that only media disks that complete the sanitization process will be logged as sanitized. The apparatus includes a scanning mechanism placed in a housing that physically receives and captures a media disk, scans barcodes on the media disk, and securely passes the media disk to the sanitizing device. A media disk will not be logged as sanitized until the apparatus has confirmed the sanitization event is complete.

An objective of the invention is to assure a secure, automated, tamperproof link between the scanning of disk label data and the sanitizing of a disk. The invention assures that only disks that are actually sanitized will be logged as sanitized.

Another objective of the invention is to provide a secure interlock between a scanner and a sanitizer, such that if a disk is "intercepted" between the scanner and the sanitizer, the "interception" will be detected and the disk will not be logged as sanitized, but rather marked as tampered with.

Still another objective of the invention is to provide hands free scanning of all barcodes on media disk to be sanitized. The scanning mechanism can read all barcodes on the drive label, regardless of the orientation of the label and the location of the barcodes. No user interaction is required other than inserting the media disk to be sanitized with the label facing the scanner camera.

Still another objective of the invention is to provide an apparatus that provides automatic handling of read failures. For instance, if the scanner mechanism fails to read a media disk label due to improper loading (i.e., disk is inserted with the label facing away from the camera), the media disk will be ejected and no logging of a sanitization event will occur.

Yet still another objective of the invention is to provide documentation of sanitization data including, but not limited to: disk numbers, time of day, sanitization method and levels, which is stored in an encrypted format which allows reading only parameters, the encrypted format cannot be altered.

Another objective of the invention is to provide an SSD media disk sanitization system that is tamperproof and captures an SSD media disk to provide evidence of destruction in such a way that the evidence cannot be forged.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring to FIGS. 1-4, the verification apparatus of the instant invention is securable to a media disk destruction device 12, such as the solid state drive media destruction device of co-pending U.S. application Ser. No. 16/405,338 entitled Solid State Drive Media Destroyer, the contents of which is incorporation herein by reference. The media disk destruction device 12 is a device used to destroy Solid State Drive's (SSD's) but maintain the physical SSD to provide physical proof of media destruction. The SSD media destroyer used by way of example employs a crusher box having rollers with teeth in a spaced apart position constructed and arranged to penetrate the SSD housing. The rollers allow for the absolute destruction of the SSD media drive, and imprints a distinctive pattern on the housing of the SSD. The rollers are shaped to process SSD's at a high rate of speed, leaving the housing with imprinted waffle like indentations that form distinctive corrugated penetrations, rendering the electronic media stored in the SSD unreadable and unaccessible. The SSD housing outline remains intake, and identifiable markings made on the outer surface of the SSD housing remains legible. However, proof that the SSD has been destroyed and maintaining an image of the SSD before destruction requires a copy of the original data label be maintained.

The verification apparatus 10 is mounted to the upper surface 11 of an SSD destruction device 12. The verification apparatus 10 includes a media disk inlet 16 for receipt of an SSD to be destroyed, a media disk outlet 18 for passing a SSD that has met predefined parameters required for passage, and a media disk ejection outlet 19 for returning a SSD that has failed to meet the predefined parameters. The media disk inlet 16 is sized for receipt of an SSD for entry into a receptacle 22 formed on a carrier drum 24 supported by a frame 26. The carrier drum 24 has a first axle of rotation 28 supporting a first side surface 31 of the carrier drum 24 and a second axle of rotation 33 coupled to a drive motor 30 along a second side surface 32 of the carrier drum 24. Sidewall 36, positioned between first side surface 31 and second side surface 32, has a receptacle slot 40 strategically positioned so that an SSD placed within the media disk inlet 16 must be rotated by the drive motor 30 as held by the receptacle 22 to a first predetermined position for receipt of an SSD media disk, a second position for positioning the SSD media disk in front of a camera 50 for scanning label data from the SSD media disk, a third position for aligning the receptacle 22 to the media destruction inlet 18, and a fourth position for aligning the SSD media disk to the ejection outlet tray 20.

The receptacle 22 forms a cradle for holding the SSD media disk as the carrier drum 24 is rotated; the cradle having a support surface 52 with a side edge cam 54 and a gate 56 with a side edge cam 58 that engage a cam track 60. In the first predetermined position, the SSD media disk is captured by the support surface 52 and gate 56. When the carrier drum 24 is rotated to a second position, the support surface 52 and gate 56 move the SSD media disk away from the media disk inlet 16 to a position where the camera 50 scans the SSD media disk. If the camera is unable to scan the SSD media disk, causing a match with information provided by a micro processor based controller 62, the carrier drum 24 is rotated to a position wherein the receptacle slot 40 aligns with the media disk ejection outlet tray 20 and the SSD media disk is ejected. Ejection would occur if the camera cannot detect the SSD label in instances where the SSD is inserted upside down, or the label has been defaced or removed. The camera 50 is capable of reading SSD labels that are inverted, and an LED light 64 provides illumination of the SSD label for scanning of the material. The controller 62 provides SSD label identification with a screen display 70. The screen display 70 is preferably a touch screen, allowing operator interface with the controller 62 having a microprocessor.

The camera 50 operates with the controller 62 to form a scanner that captures disk labels and scans barcodes before securely passing the SSD media disk to the media destruction device 12. The SSD media disk will not be logged as sanitized until the sanitizing device 10 has confirmed the sanitization event. The controller 62 provides a secure interlock between the carrier drum 24 and the media destruction device 12, such that, if the SSD media disk is "intercepted" by the camera 50, the "interception" will be detected and the SSD media disk will not be logged as sanitized, but rather marked as tampered with. The camera 50 is positioned within the housing 14 to provide hands free scanning of all barcodes. The camera 50 can read all barcodes on the SSD drive label regardless of the orientation of the label and the location of the barcodes, assuming the SSD media disk is inserted with the SSD label facing the camera 50. In the preferred embodiment, a single camera is employed, although additional cameras could be added.

The controller 62 provides an automatic handling of read failures. If the camera 50 fails to read the SSD media disk label, the SSD media disk will be ejected out of the media disk ejection outlet tray 20. The controller 62 records all sanitization data, including SSD media disk numbers, time of day, sanitization method and levels, and the like, all stored in an encrypted format which can be read but not altered.

A successful scanning of the SSD label data allows the carrier drum 24 to rotate to the third position for directing the SSD media disk into the media destruction inlet 18 for sanitization. The cam track 60 is semi circular, which keeps the support surface 52 and gate 56 in position to support the SSD media disk. The cam track 60 includes a right angle bend which causes the gate cam 58 to open, wherein the support surface 52 and gate 56 will no longer support an SSD, allowing release into the media destruction device 12. The frame 26 is secured to the media destruction device 12 by a plurality of fasteners 71 located within the housing 14.

To assure the SSD documentation cannot be tampered with, an upper surface of the media destruction device 12 must be disassembled to allow for installation of the frame 26 using the fasteners 71, which makes the verification apparatus 10 impossible to access the controller electronics 62 when the media destruction device 12 is operating. The controller electronics 62 includes predetermined parameters regarding scanning of labels including the use of a random code generator. In a preferred embodiment a transmitter having a short range communication link, like a low power IR link or similar link that requires close physical proximity to transmit a pseudo random code at least every second. The media destruction device includes a transmitter, not shown, that will instantly transmit the same pseudo random code back to the electronics 62. Using this type of short range link, if the media destruction device 12 is tampered with, the communication link will be broken. If the communication is broken, even for a second, the SSD media disk 100 will not be registered as sanitized. It is noted that the verification apparatus 10 can be used in combination with any media destruction device, whether or not the media destruction device physically alters the SSD media disk. Media destruction devices can range from electronic degaussing to partial SSD destruction, to total SSD destruction.

Figure 5:
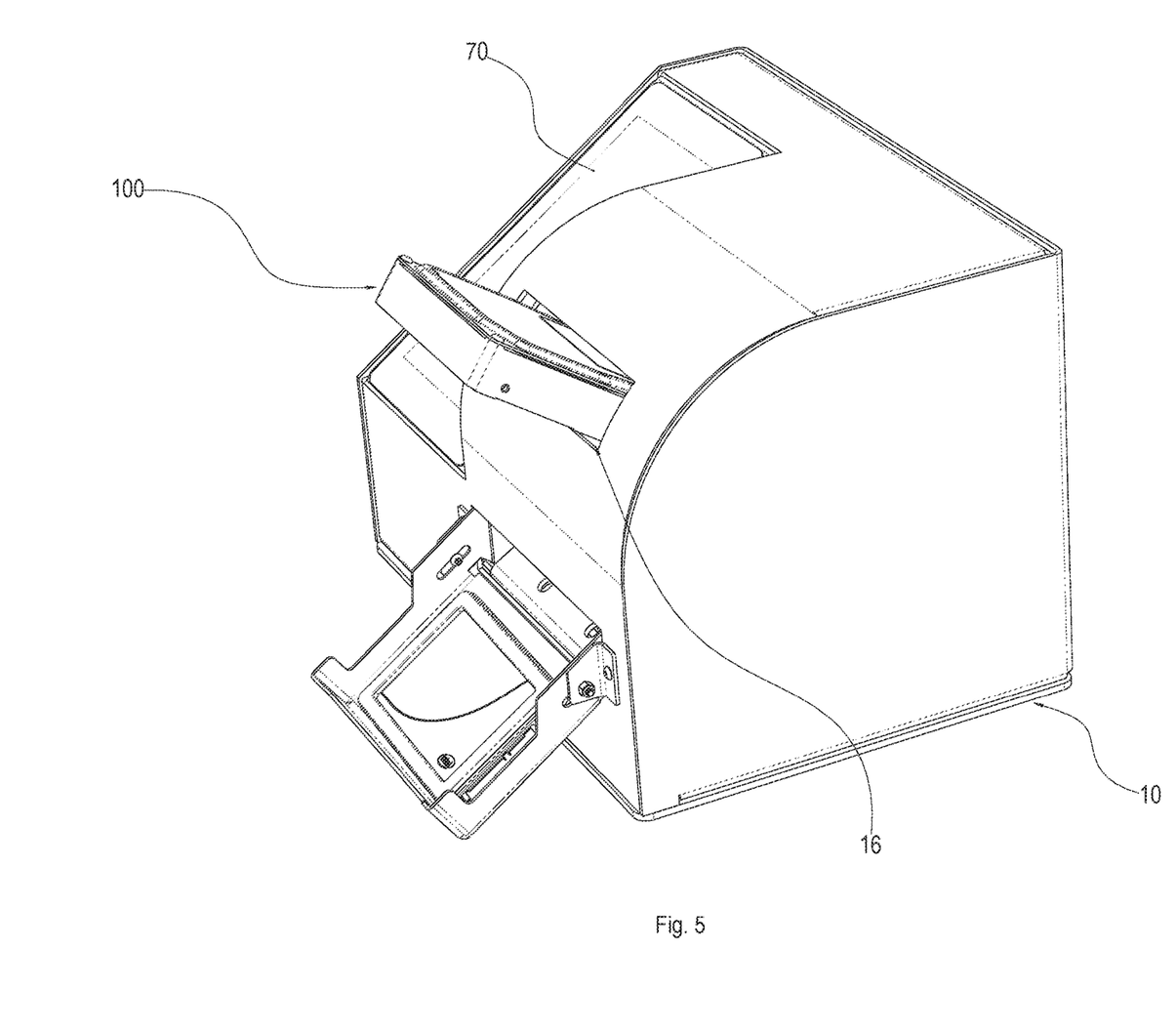
FIG. 5 is a perspective view of the verification apparatus with a media disk being inserted.
Figure 6:
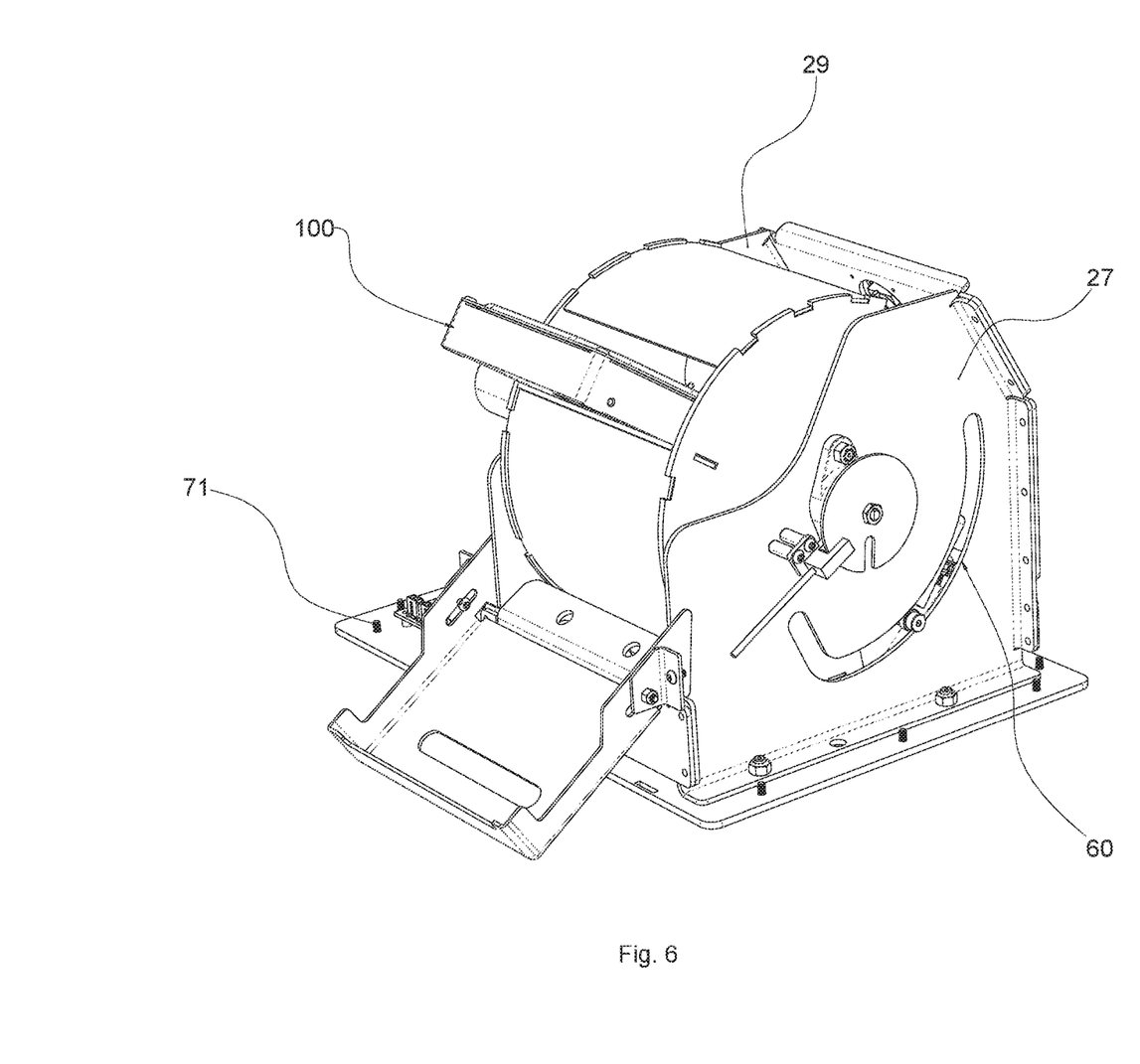
FIG. 6 is a perspective view of FIG. 5, illustrating a media disk being inserted using a partial cutaway.
Figure 7:
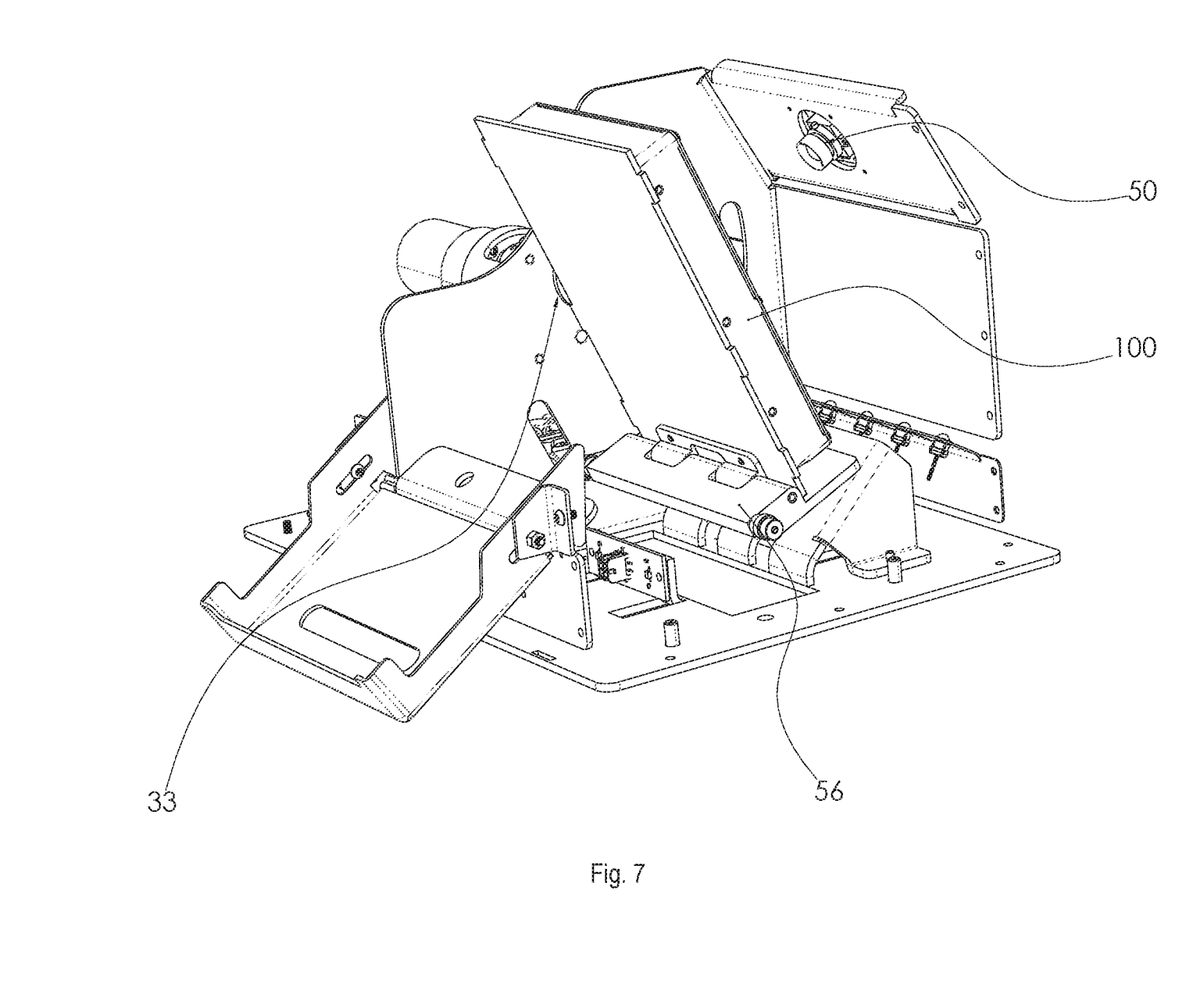
FIG. 7 is a perspective view of the verification apparatus, illustrating the media disk in a scanning position with a partial cutaway of the housing.

FIG. 5 is a perspective view of the verification apparatus 10 with an SSD media disk 100 being inserted into the media disk inlet 16 with operation aspects displayed on the display screen 70. The display screen 70 is further defined as a touch screen allowing operator interface. FIG. 6 illustrates the housing internals with the SSD media disk 100 being inserted with the carrier drum 24 removed to illustrate the cam track 60 on the right side surface 27 of the frame 26, and cam track 60 of the left side surface 29 of the frame 26. As previously described, the cam tracks are constructed and arranged to guide the support surface 52 and gate 56 during rotation within the frame 26. FIG. 7 is a perspective view of the verification apparatus 10 illustrating the SSD media disk 100 in a scanning position, wherein the camera 50 is aligned to scan the label text found on the front surface of the SSD media disk 100. The camera 50 provides hands free scanning of all barcodes on media disks to be sanitized. The camera with scanning software incorporated into the controller electronics 62 can read all barcodes on a SSD drive label regardless of the orientation of the label and the location of the barcodes. The verification process includes a visual depiction of the label captured by the camera 50 on the display screen 70. No user interaction is required other than inserting the media disk to be sanitized with the label facing the scanner camera.

Figure 1:
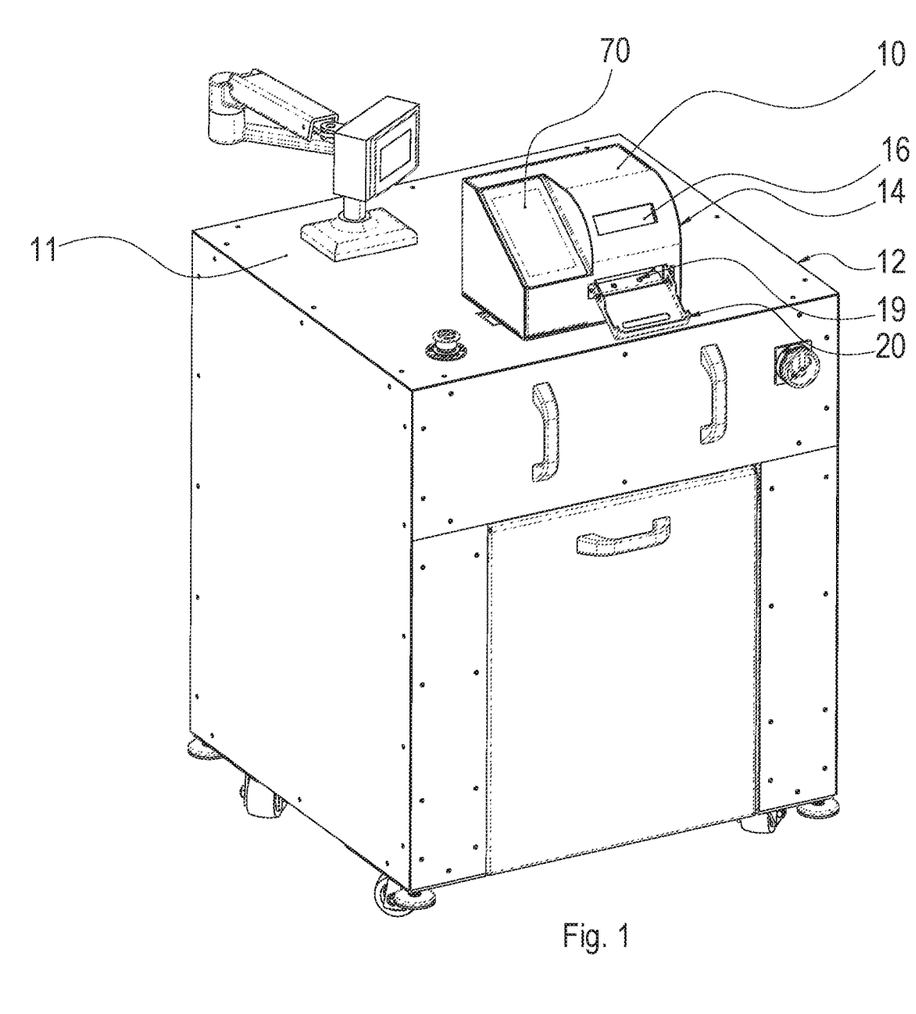
FIG. 1 is a perspective view of the verification apparatus.
Figure 2:
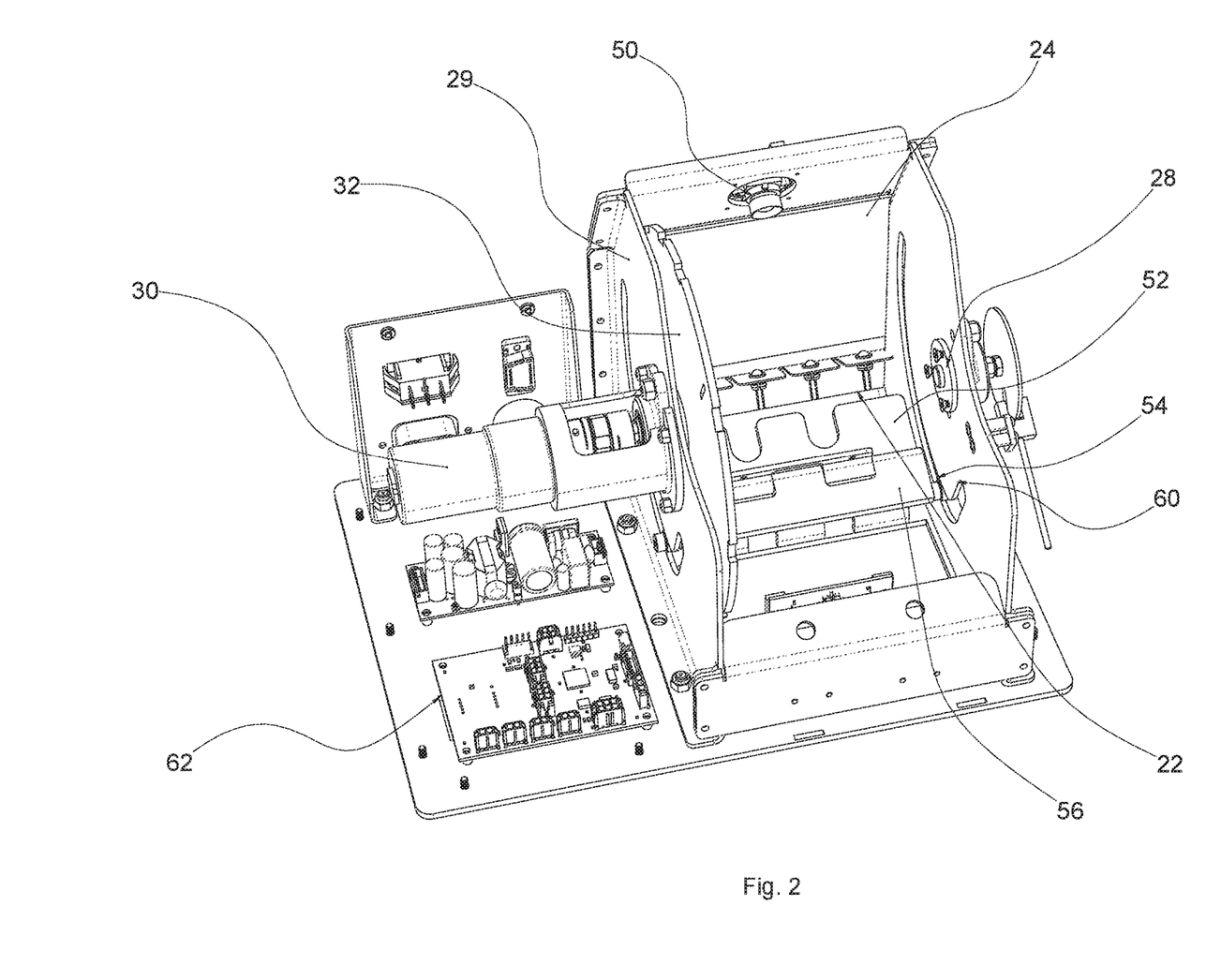
FIG. 2 is a perspective view of the verification apparatus of the instant invention with a partial cutaway of the housing.
Figure 3:
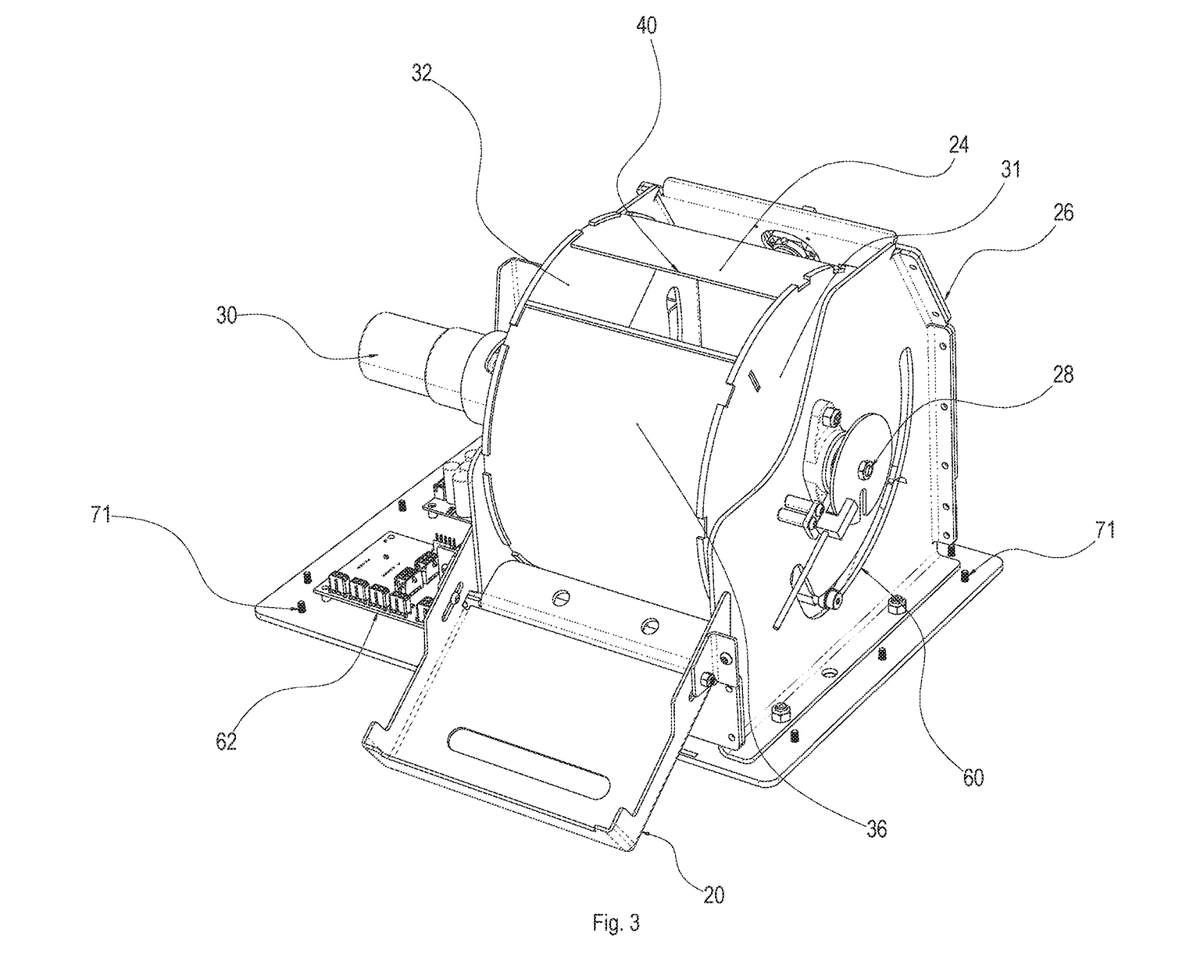
FIG. 3 is a perspective view of the verification apparatus, illustrating the carrier drum.
Figure 4:
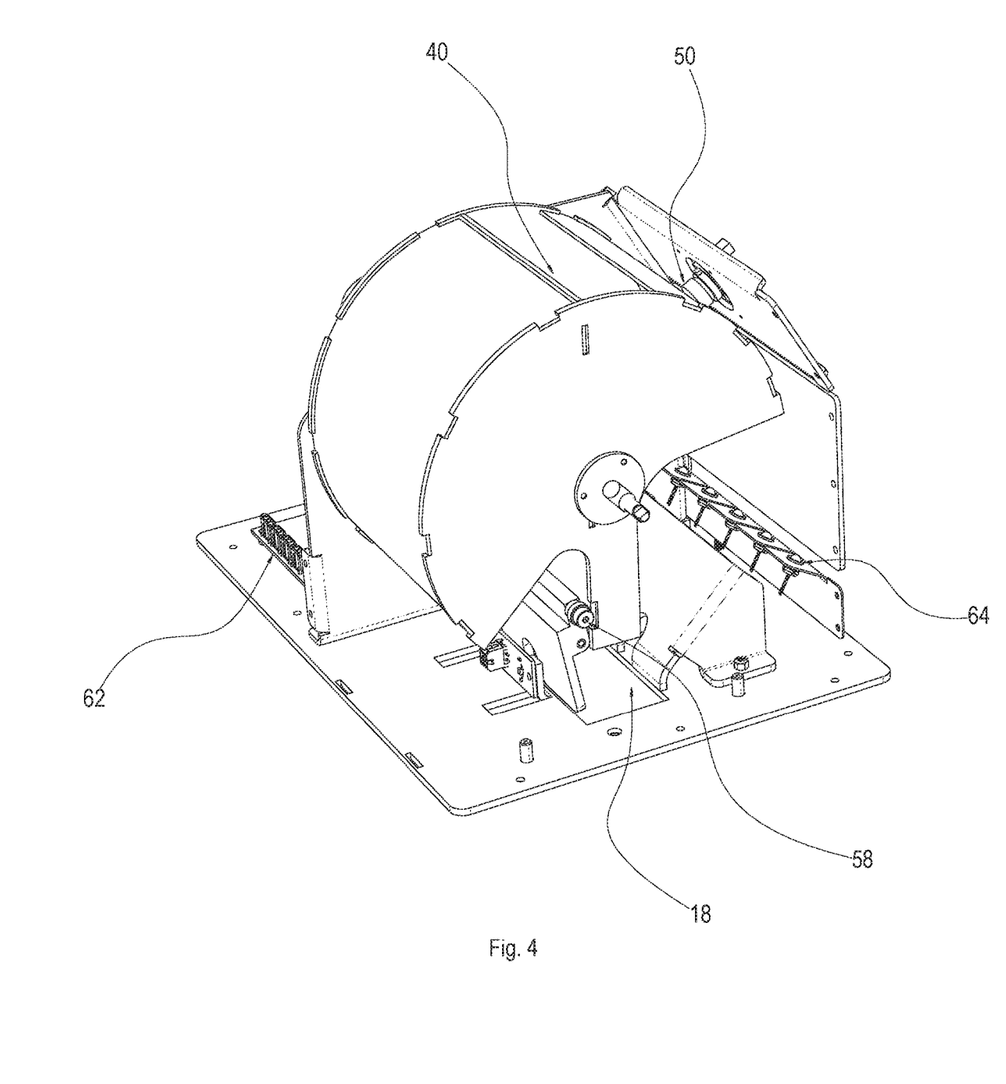
FIG. 4 is a perspective view of the carrier drum with component placement.
Figure 8:
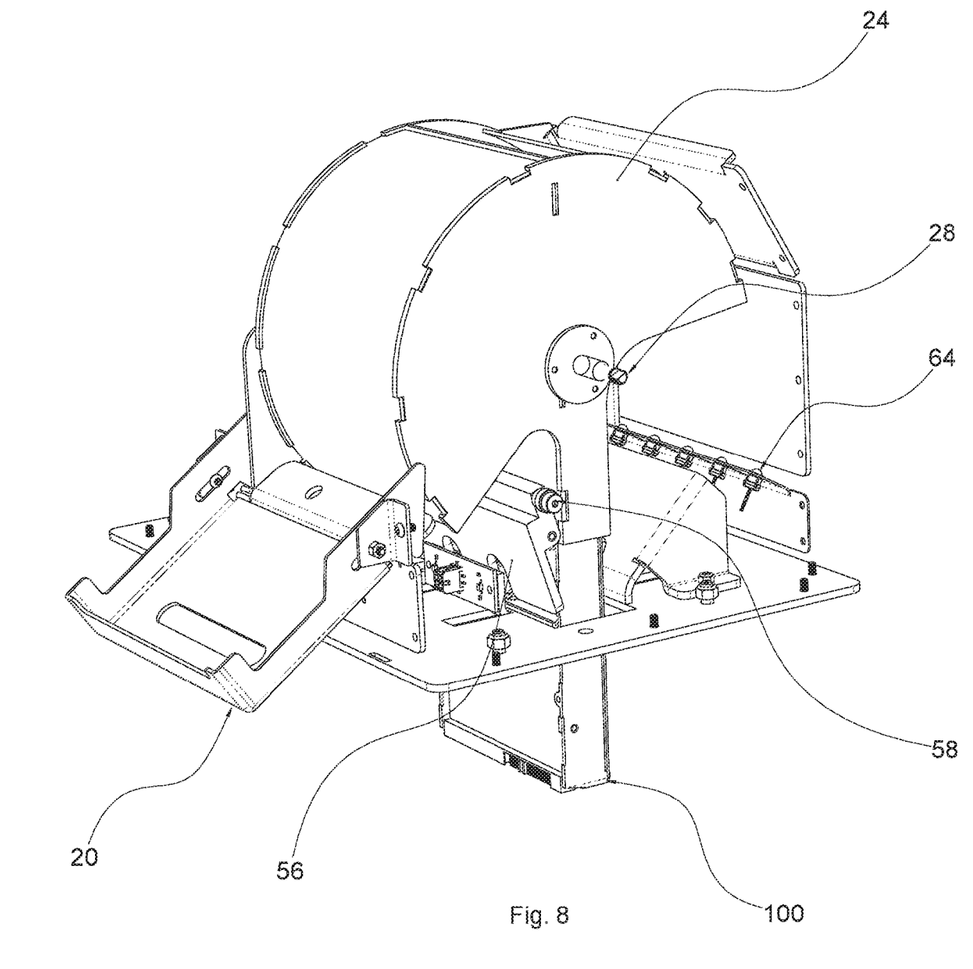
FIG. 8 is a perspective view of the verification apparatus, illustrating the media disk in a drop position with a partial cutaway of the housing.
Figure 9:
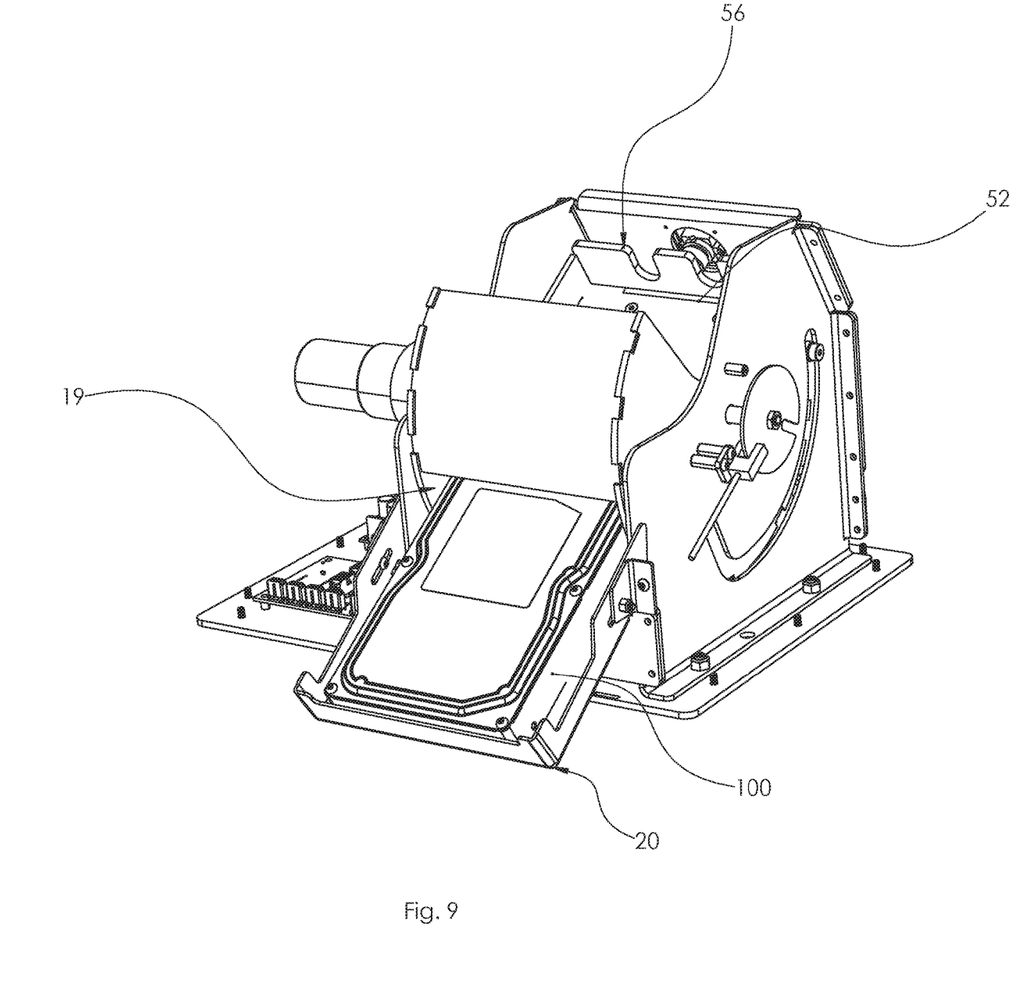
FIG. 9 is a perspective view of the verification apparatus, illustrating the media disk in an eject position with a partial cutaway of the housing.
Figure 10:
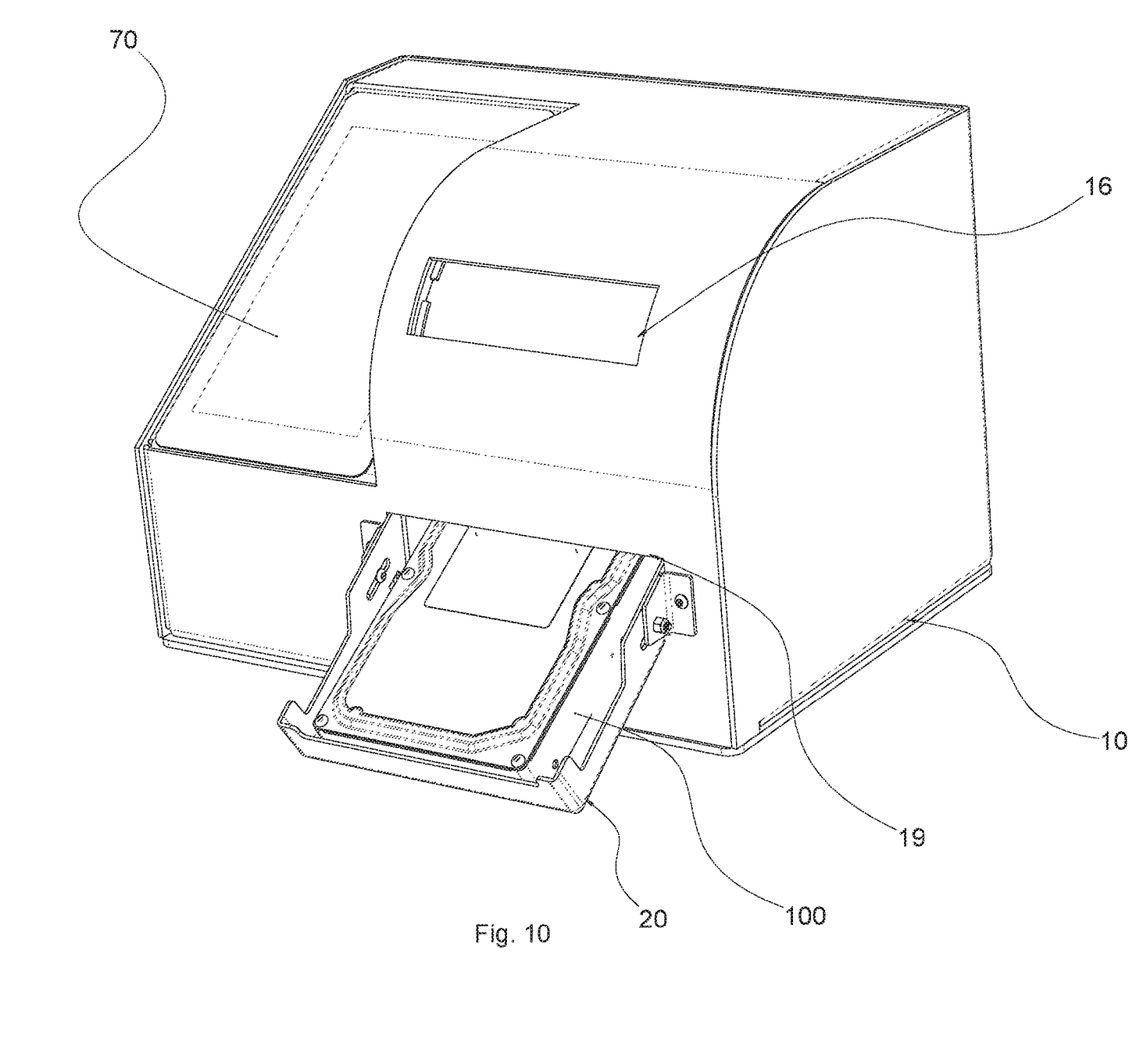
FIG. 10 is a perspective view of the verification apparatus, illustrating the media disk in an eject position.

FIG. 8 depicts the carrier drum 24 rotated into a position for inserting the SSD media disk 100 into the media destruction device, not shown. The gate 56, using the gate cam 58 to follow the cam track 60 illustrated in FIG. 3, is forced to separated from the support surface 52 allowing the SSD media disk 100 to drop into the media destruction device 12 by gravity. FIG. 9 illustrates the SSD media disk 100 in an eject position due to the failure of the camera to properly scan a label, or an interruption in the code being sent and received between the verification apparatus 10 and the media destruction device 12. The support surface 52 releases the SSD media disk 100 to allow ejection through the media disk ejection outlet 20 depicted in FIG. 10. The display screen provides text information regarding the failure to scan and ejection.

In the preferred embodiment, the verification apparatus 10 will not operate without a flash drive present and a filename specified. Also, in the preferred embodiment, an asymmetric key pair is used for encryption, wherein a public key resides on the verification apparatus 10 and is used to encrypt the data recorded. A private key resides in custom decryption software which will run on the PC. There is no security breach if the public key is widely known. Data files can only be read using a private key. Data can be copied to a standard non-encrypted file (CVS, XLS, etc.), but the original encrypted file cannot be modified—it is the secure reference. In an alternative embodiment, key pairs can be changed via the web. This allows the private key to be changed if it has been compromised. The user will need to know which key pair was used to encrypt the files. This can be done by recording what keys were used on what days. Files will be time stamped with the time obtained from the web. In yet another embodiment, data can be immediately transferred to a cloud-based server via a secure protocol, wherein no intermediate files are required. Data is encrypted and can be transferred to a standard non-encrypted file (CVS, XLS, TXT) using a secure protocol.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A verification apparatus securable to a media disk destruction device, said verification apparatus comprising:
   a housing constructed and arranged for securement to an upper surface of said media disk destruction device, said housing having an inlet for receipt of a solid state drive (SSD) disk to be processed, an outlet aligned with an opening to said media destruction device for receipt of an SSD disk that meets predetermined parameters, and a SSD disk ejection outlet for return of an SSD disk that fails to meet said predetermined parameters;

a display screen having an operator interface secured to said housing, said display screen electrically coupled to a microprocessor based controller containing said predetermined parameters;

a scanner camera mounted inside said housing and coupled to said controller, said scanner recording SSD disk label data placed through said housing and displayed on said screen, said controller analyzing if a recorded SSD disk label data is in accordance with said predetermined parameters;

a carrier drum having a receptacle for holding a SSD disk, said carrier drum rotatable to a first position for receipt of the SSD disk, a second position for positioning the SSD disk in front of said scanner camera, a third position for aligning said receptacle to said media destruction device opening, and a fourth position for aligning said SSD disk to said ejection outlet; and a motor coupled to said carrier drum and said controller;

wherein successful scanning of said SSD disk label data allows said carrier drum to rotate to said third position for directing the SSD disk into said media destruction device opening for sanitization, or alternatively rotating said carrier drum to said fourth position for ejecting the SSD disk due to a scanner fault.

2. The verification apparatus according to claim 1 wherein said controller continuously transmits time variant pseudo random codes to said media destruction device, and said media destruction device transmits a code back to said controller during a sanitization procedure, wherein a break in transmitting said time variant pseudo random code prohibits registering said SSD disk as sanitized and the SSD disk is ejected from the housing.

3. The verification apparatus according to claim 2, wherein said time variant pseudo random code is generated at least once per second.

4. The verification apparatus according to claim 2, wherein said time variant pseudo random code is communicated by a short range communication link.

5. The verification apparatus according to claim 1, wherein said carrier drum has opposing side walls and mirror image cam tracks constructed and arranged to engage a gate for securing said SSD disk during partial rotation of said carrier drum and releasing said SSD disk after complete rotation.

6. The verification apparatus according to claim 1, wherein said scanner camera is constructed and arranged to read all barcodes on a SSD disk label regardless of the orientation of said label or the location of said barcodes.

7. The verification apparatus according to claim 1, wherein said display screen is further defined as a touch screen allowing operator interface.

\* \* \* \* \*